United States Patent [19]

Knipe et al.

[11] 3,755,726

[45] Aug. 28, 1973

[54] CLOSED LOOP MOTOR CONTROLLED CONDITION RESPONSIVE SYSTEM

[75] Inventors: Leonard E. Knipe, Longview; Carl D. Furra, Houston, both of Tex.

[73] Assignee: Continental Can Company, Inc., New York, N.Y.

[22] Filed: May 20, 1971

[21] Appl. No.: 145,231

[52] U.S. Cl.............. 318/563, 318/565, 318/610, 318/685, 318/678, 318/663
[51] Int. Cl. ............................................. G05b 9/02
[58] Field of Search.................. 318/563, 565, 566, 318/646, 663, 674, 678, 685, 609, 610

[56] References Cited
UNITED STATES PATENTS

| | | | |
|---|---|---|---|
| 3,582,629 | 6/1971 | Ross......................... | 318/610 X |
| 3,418,547 | 12/1968 | Dudler........................ | 318/663 X |
| 3,184,188 | 5/1965 | Rossire....................... | 318/566 X |
| 3,138,750 | 6/1964 | Burger et al................ | 318/563 |
| 2,411,139 | 11/1946 | Roy et al..................... | 318/646 X |

Primary Examiner—T. E. Lynch
Attorney—Petherbridge, O'Neill & Lindgren

[57] ABSTRACT

A condition responsive detection system having a feedback servo control to adjust the system response to compensate for normal operational variations in the monitored condition. The detection system includes a strain gauge transducer providing an analog output signal coupled as one input to a differential amplifier which receives a second input through a potentiometer adjustable in response to a stepper motor. The AC signal from the transducer is compared to a DC voltage established by the adjustable resistor and the differential portion of the signal is amplified and coupled to a network of Schmitt triggers, each firing One-Shot or Monostable multivibrators when the threshold level has been reached. The output from the Schmtt trigger actuated multivibrators is coupled to suitable indicators and the stepper motor to adjust the variable resistor for changing the established DC voltage level to compensate for normal operational variations included in the output from the strain gauge transducer.

18 Claims, 4 Drawing Figures

PATENTED AUG 28 1973 3,755,726

INVENTORS.
LEONARD E. KNIPE
CARL D. FURRA

BY Petherbridge, O'Neill &
Lundgren

ATTORNEYS.

SCHMIDTT TRIGGERS

| | $R_A$ | $R_B$ | $R_C$ | $V_{REF}$ |
|---|---|---|---|---|
| SCHMIDTT 51 | 33K | 22K | 0 | −15V |
| SCHMIDTT 52 | 22K | 33K | 0 | −10V |
| SCHMIDTT 53 | 13K | 27K | 0 | −8.0V |
| SCHMIDTT 54 | 10K(POT) | 24K | 6.8K | −7.0 → 0.0V |

ONE SHOTS MULTIVIBRATORS

| O.S. MULTIVIBRATOR | 61 | $R_X$ = 27K |
|---|---|---|
| O.S. MULTIVIBRATOR | 62 | $R_X$ = 33K |
| O.S. MULTIVIBRATOR | 63 | $R_X$ = 27K |
| O.S. MULTIVIBRATOR | 64 | $R_X$ = 27K |

INVENTORS.
LEONARD E. KNIPE
CARL D. FURRA
BY Petherbridge, O'neill &
Lindgren
ATTORNEYS.

CLOSED LOOP MOTOR CONTROLLED RESPONSIVE SYSTEM

BACKGROUND OF THE INVENTION

This invention relates to a condition responsive detecting system and, in particular, to a self-regulating detecting system which compensates for normal operational variations in the monitored condition.

More specifically, this invention relates to a detecting system utilizing the output from a strain gauge transducer coupled to a differential amplifier system. The input to the differential amplifier system also includes a base reference signal to which the strain gauge output is compared. The base reference signal is adjusted for normal operational variations. The output from the differential amplifier, therefore, will continuously adjust the system for normal operational variations and indicate only abnormal responses in the monitored condition.

Detecting systems or condition responsive devices are used in various applications for monitoring the operational functions of machinery to indicate the occurrence of predetermined events. In certain applications of these devices the system may indicate, for example, the presence or absence of an item passing through a manufacturing cycle, the number of units which have passed a predetermined point, or the occurrence of a machine malfunction. Such systems have been designed utilizing photosensors, mechanical limit switches, magnetic fields, object weight, and many other physical characteristics of the condition or object to be monitored for providing a suitable source of indication as to the occurrence of desirable or undesirable events. However, many of these systems have undesirable characteristics due to potential errors within the operational portion of the detecting system itself, and none of these systems provide automatic regulatory control for adjusting the detecting system response to compensate for normal operational changes that occur in the function of the machinery or condition being monitored.

SUMMARY OF THE INVENTION

It is, therefore, an object of this invention to improve detecting or condition responsive systems.

Another object of this invention is to regulate the response of a detecting system to compensate for normal operational changes in the monitored condition while maintaining a preset differential between normal and abnormal conditions.

A further object of this invention is to minimize the possible malfunctions of the monitoring system.

Still another object of this invention is to provide an analog signal source corresponding to the changes occurring in the monitored condition.

These and other objects are attained in accordance with the present invention wherein there is provided a self-regulating detection system adapted to adjust the system response for normal operational variations in the monitored condition and indicate only abnormal conditions.

DESCRIPTION OF THE DRAWINGS

Further objects of the invention, together with additional features contributing thereto and advantages accrueing therefrom, will be apparent from the following description of the invention when read in conjunction with the accompanying drawings, wherein.

DESCRIPTION OF THE PREFERRED EMBODIMENT

Figure 1:
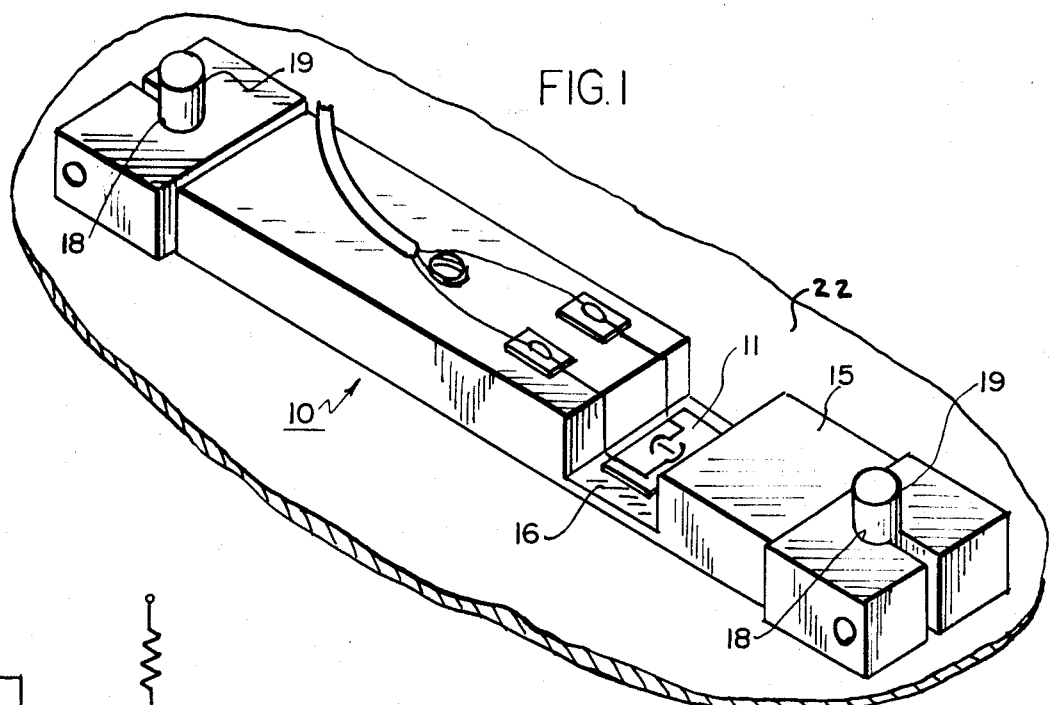
FIG. 1 is a frontal perspective view of the sensor portion of the detecting system.
Figure 3:
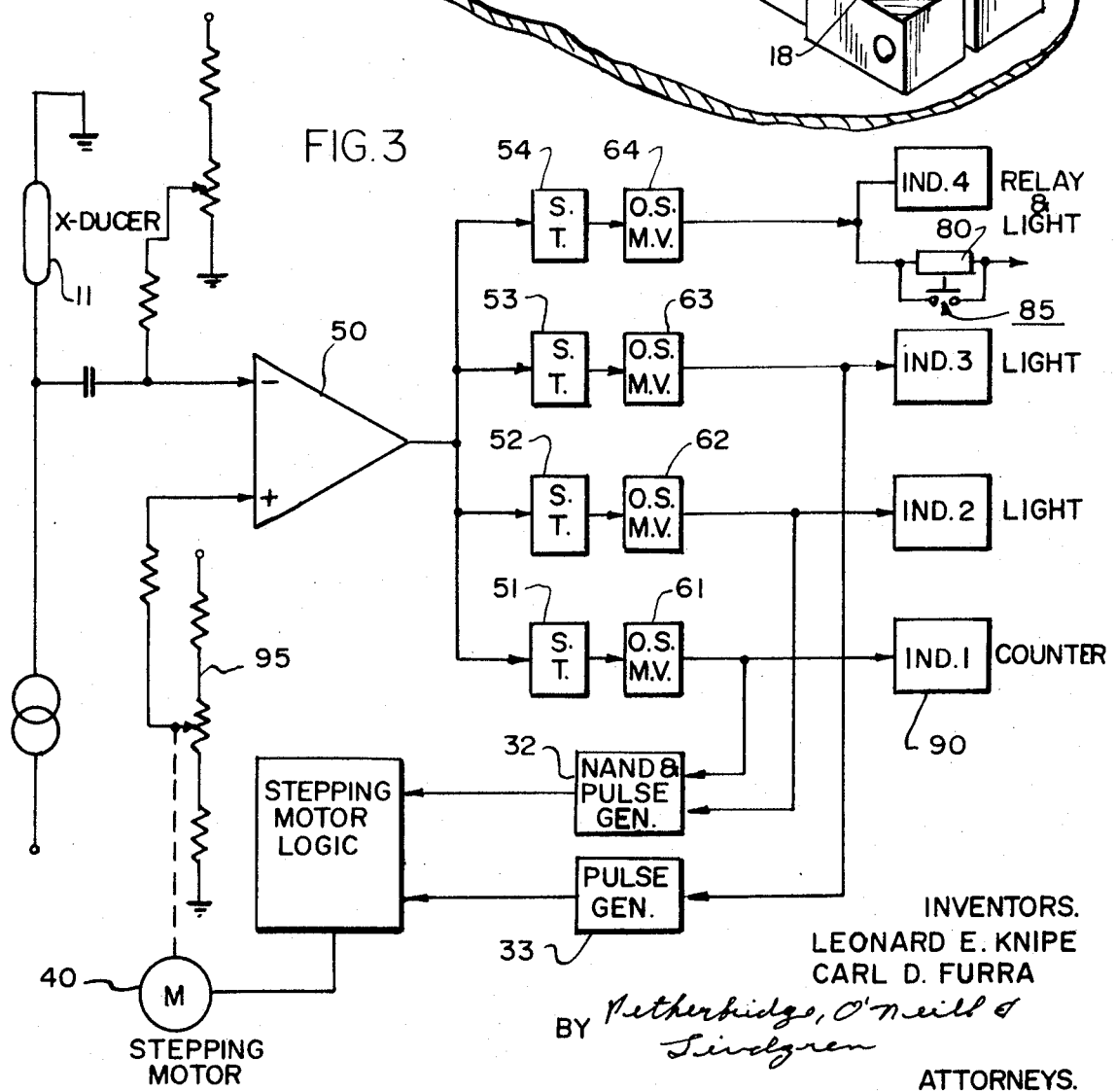
FIG. 3 is a functional logic block diagram of the sensor system.
Figure 4:
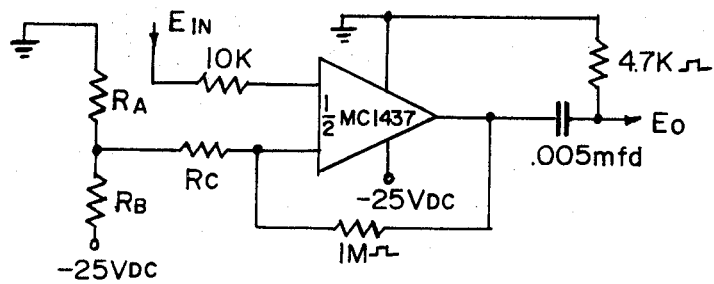
FIG. 4 is an electrical schematic of portions of the detector system to better illustrate a preferred embodiment.
Figure 4:
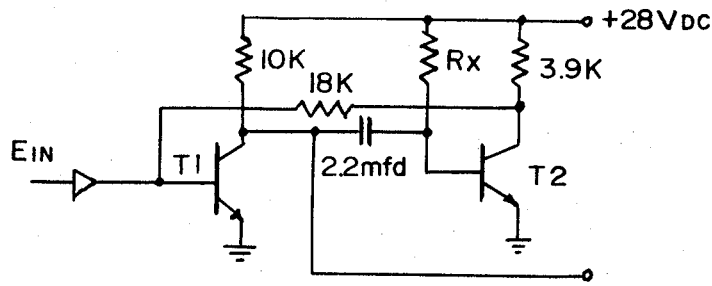

Referring now to FIG. 1, there is shown a sensor apparatus 10 which is used to provide an output signal to the logic circuitry shown in FIGS. 3 and 4. While the sensor may be utilized to monitor many diverse conditions, for convenience of illustration its use will be described with reference to its application on a punch press. However, such an example is not to be construed as a limitation, but merely as a suitable illustration of a preferred embodiment.

In the operation of a punch forming press, it is necessary to have a reliable and accurate detector system for sensing an overload condition to shut down the punch in order to protect the press and its component tooling from damage and destruction resulting from a jam or foreign object entering the punch die. Existing detecting systems now in use for such purposes require constant maintenance, are unreliable, and insensitive to other than major jams. Furthermore, increased usage of expensive tooling requires a reliable system sensitive enough to differentiate between minute interferences and normal operating conditions so that these abnormal conditions may be corrected before damage occurs.

The detecting system, hereinafter described in detail, comprises essentially solid state electronics and has no moving parts. The sensor 10 includes a semi-conductor electrical strain gauge 11 bonded to a mechanical strain amplifier 15 which is then rigidly mounted on the punch frame 22. The transducer or strain gauge 11 produces an electrical analog signal of a magnitude determined by the strain level of the machine frame.

The sensor 10 comprises a strain amplifier 15 machined from byrilium copper (byrilco 25) with a portion of the amplifier being ground to a thickness of approximately 0.032 inches to provide a stress concentration area (16) wherein the strain gauge 11 is mounted. In one embodiment, shown in FIG. 1, the strain amplifier has a pair of mounting holes 18 jig bored at each end of the strain amplifier on exact predetermined centers. The sensor 10 is then clamped about dowel pins 19 which have been press fitted into jig bored holes in the punch press frame.

Figure 2:
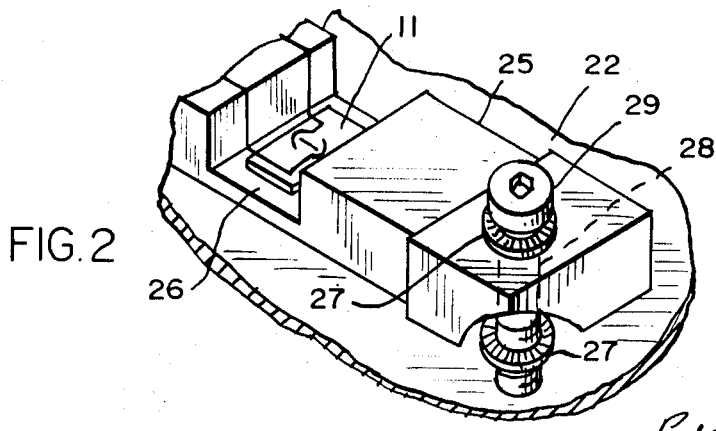
FIG. 2 is a frontal perspective view of a portion of an alternative embodiment of the sensor used in the detecting system.

In another embodiment of the sensor shown in FIG. 2, the strain amplifier 25 is constructed the same as the strain amplifier 15, being formed with a ground stress concentration area 26. However, this alternative embodiment is formed such that the strain amplifier 25 has mounting holes 28 drilled in the strain bar and the sensor is mounted to the press frame with standard button head cap screws 29 with the sensor secured to the press frame by means of hardened serrated washers 27 which are serrated on both sides.

In a preferred embodiment, the bonding of the strain gauge 11 on the sensor 10 is achieved by spot welding weldable gauges such as FPD 3-20-100C9 (available from BLH Electronics, Inc.) and have an unmounted resistance of approximately 1,000 ohms and a gauge factor of about 135. The filament length is approximately 0.200 inches and is mounted on a bakelite backing. The thermal expansion coefficient of the gauge is such that it is matched to the strain amplifier to provide constant sensitivity at various temperatures. The gauges are bonded to the strain amplifier with BLH Electronics epoxy cement No. 150 and clamped with spring loaded clamps at about 15 PSI. After about 2 hours, the clamps are removed and the strain bar with gauge mounted is heated at 150° F for 2 hours which cures the cement and ensures that there is no moisture content left in the gauge filament. After heating, the gauge is sealed with RTV sealing compound and a machined plastic cover is placed over the top of the bar to seal the gauge and provide mechanical protection thereof.

The output signals from the mounted sensor assembly are coupled to an electronic circuit disclosed in FIGS. 3 and 4. As best shown in the functional logic block diagram of FIG. 3, the output from the strain gauge transducer 11, in the form of an analog signal, is applied to a differential amplifier 50 whereat the primary signal from the strain gauge is compared to a DC reference voltage established by a feedback loop to be hereinafter described in detail. The differential portion between the primary and the reference signal is amplified and applied to four Schmitt triggers (51 – 54) having predetermined threshold levels which have been set in accordance with the desired sensitivity of the system as illustrated in FIG. 4. The output of each Schmitt (51 – 54) is coupled to a One-Shot or Monostable multivibrator 61 – 64, respectively, and is utilized, when actuated, to drive indicators and form a portion of the feedback loop which actuates a stepper motor 40 to adjust the potentiometer 95 for varying the reference voltage to which the output from the strain gauge transducer 11 is compared.

The feedback loop maintains the amplified signal from the differential amplifier 50 at an amplitude sufficient to trigger the Schmitt-OneShot system 51 – 61 during normal working operation of the press. If the output from the amplifier is not sufficient to trigger the Schmitt-OneShot system 51 – 61, which is the desired normal condition when the press is idling and no work piece has been fed into it, the detecting system is inoperative and none of the indicators are actuated.

If the Schmitt-OneShot combination 51 – 61 is actuated exclusively, a suitable indicator such as a counter 90 is actuated indicating that a work piece feed has taken place and a pulse is provided to the stepping motor 40 through a NAND gated pulse generator 32 which drives the stepper motor to adjust the potentiometer 95 thereby varying the reference voltage to which the strain gauge output is compared.

In normal operating conditions, the Schmitt-OneShot systems 51 – 61 and 52 – 62 are both actuated, coupling a pulse to the counter 90 to indicate a work piece feed and actuating a light to indicate that the system is functioning normally. Due to the NAND logic, when a pulse is received from both Schmitt-OneShot systems 51 – 61 and 52 – 62, no pulse is coupled to the stepper motor 40 and the system remains at its status quo.

In the event that the output from the differential amplifier 50 is sufficient to trip the Schmitt-OneShot systems 51 – 61, 52 – 62 and 53 – 63, the counter is actuated to indicate a feed and a warning light is actuated to indicate that the system requires adjustment. This adjustment is achieved by means of the feedback loop. The output signals from Schmitt-OneShot systems 51 – 61 and 52 – 62 do not actuate the stepper motor 40 due to the NAND logic 32, while the output signal of the Schmitt-OneShot system 53 – 63 actuates the pulse generator 33 to drive the stepper motor in a reverse direction varying the reference level voltage to which the strain gage output is compared.

In the event of a misfeed, malfunction or an abnormal system response, the output from the transducer is sufficient to actuate all four Schmitt trigger One-Shot systems with the result that the output from the Schmitt-OneShot system 54 – 64 opens a normally closed relay 80 which terminates machine operation and a suitable indicator such as a light is operated to indicate that the machine is shut down and a malfunction has occured.

While there is shown in FIG. 4 a preferred value range for the threshold levels of the Schmitt triggers and One-Shot multivibrators, the sensitivity of the threshold levels of the triggers is arbitrarily set. The sensitivity of the Schmitt-OneShot system 54 – 64 may be adjusted to detect minute interferences in the press dies or it can be set to trigger only on severe interferences such as occur when a double feed is occasioned. The sensitivity of the detecting system may be set while the press is in operation by breaking the circuit to the relay 80 by means of a bypass switch 85 which bypasses the shut down relay 80. The indicator lamp 4 is lighted, but the bypass switch permits the machine to continue functioning without occasioning a shut down. Functionally, when the bypass switch is depressed the press will continue to operate and the Schmitt-OneShot system 53 – 63 is actuated providing a signal to the stepper motor 40 through the pulse generator 33. Actuation of the stepper motor will adjust the potentiometer 95 until the reference signal coupled to the differential amplifier 50 is at a level to terminate the output of the Schmitt-OneShot system 53 – 63. When the output from the amplifier 50 is at a level whereat only Schmitt-OneShot systems 51 – 61 and 52 – 62 are continuing to operate the system is in the normal operational condition. In this manner, the same differential in system response is maintained independent of the actual output from the transducer 11. Thereafter, the bypass switch is released and the system will continue to function as previously described responding to the output signal from the transducer to actuate any of the combinations of Schmitt trigger One-Shot systems.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation to the invention without departing from its essential teachings. Therefore, it is intended that the invention not be limited to the particular embodiment disclosed as the best mode contemplated for carrying out this invention, but that the invention will include all embodiments falling within the scope of the appended claims.

What is claimed is:

1. A condition responsive detection system comprising
   condition responsive means for monitoring a condition and providing an output signal in response thereto,
   means for receiving and comparing said output signal to a predetermined reference signal,
   said receiving and comparing means providing an actuating signal of a magnitude determined by the differential between the output signal received and said predetermined reference signal,
   threshold detector means for receiving said actuating signal and providing enabling signals when the level of the actuating signal exceeds a threshold level thereof comprising,
   a plurality of Schmitt triggers having predetermined threshold detecting levels,
   at least one of said plurality of Schmitt triggers having a threshold level different than any others of said plurality,
   means coupled to said enabling signals actuable in response thereto for establishing the level of said predetermined reference signal.

2. The apparatus of claim 1 wherein said condition responsive means provides an analog output signal to said means for receiving and comparing said output signal to a predetermined reference signal.

3. The apparatus of claim 2 wherein said condition responsive means comprises a strain gauge transducer.

4. The apparatus of claim 3 wherein said strain gauge transducer is carried by a strain amplifier operatively connected to means for defining a condition.

5. The apparatus of claim 4 wherein said strain gauge transducer is carried by a portion of said strain amplifier wherein strain is concentrated.

6. The apparatus of claim 1 wherein said means for receiving and comparing said output signal to a predetermined reference signal comprises a differential amplifier.

7. The apparatus of claim 2 wherein said means for receiving and comparing said output signal to a predetermined reference signal comprises a differential amplifier having coupled thereto as one input the analog output signal from said condition responsive means and as a second input said predetermined reference signal.

8. The apparatus of claim 1 wherein said threshold detecting means have at least three discrete threshold detecting levels.

9. The apparatus of claim 1 wherein said means coupled to said enabling signal actuable in response thereto for establishing the level of said predetermined reference signal includes a stepper motor operatively connected to a potentiometer for increasing or decreasing the reference signal established thereby.

10. The apparatus of claim 1 further including indicator means coupled to said threshold detector means for receiving said enabling signals and actuable thereby to indicate when a threshold level thereof has been exceeded.

11. The apparatus of claim 1 further including means coupled to said threshold detector means for receiving said enabling signals to terminate the monitored condition upon the level of said actuating signals exceeding a threshold level thereof.

12. The apparatus of claim 10 wherein said means for indicating when a threshold level of said threshold detector means has been exceeded includes a counter.

13. A condition responsive detection system comprising
   condition responsive means for monitoring a condition and providing an analog output signal in response to said condition,
   means for comparing said output signal to an established reference signal thereby producing an actuating signal of a level determined by the differential therebetween,
   a plurality of Schmitt trigger threshold level detectors having discrete threshold levels coupled to said actuating signal to provide enabling signals in response to the level thereof,
   control logic means for receiving said enabling signals and generating command signals in response thereto, and
   means for receiving said command signals actuable to establish said reference signal.

14. The apparatus of claim 13 wherein said means for receiving said command signals includes a potentiometer adjustable to vary said reference signal.

15. The apparatus of claim 13 wherein said control logic means includes coincidence means for receiving said enabling signals.

16. The apparatus of claim 13 wherein said control logic means includes pulse generators selectively actuable by said enabling signals to generate said command signals.

17. A condition responsive detection system comprising
   a strain gauge transducer means for providing an analog output signal in response to strain occurring therein,
   a differential amplifier having said output signal coupled thereto as one input and a second input coupled thereto establishing a reference signal for comparing with said strain gauge output signal to thereby provide an actuating signal of a magnitude dependent on the differential therebetween,
   a plurality of Schmitt triggers for receiving said actuating signal and triggering monostable multivibrators coupled thereto when the actuating signal from said differential amplifier reaches the threshold level of said triggers,
   pulse generators coupled to the output from said monostable multivibrators controlling the energization of a stepper motor coupled thereto, and
   a potentiometer operatively connected to said stepper motor for adjustment thereby to establish said reference signal coupled to said differential amplifier.

18. The apparatus of claim 17 wherein said strain gauge transducer means includes a mechanical strain amplifier having a predetermined length adapted to be secured to means for defining a strain condition,
   said strain amplifier having a stepped portion reduced to form an area of stress concentration,
   a strain gauge transducer fixed to said strain amplifier at said stress concentration area, and
   means for fixing said strain amplifier to said strain condition defining means.

* * * * *